Aug. 21, 1945.  W. H. T. HOLDEN  2,382,994
ELECTRIC MANEUVERING BOARD
Filed Dec. 11, 1943  3 Sheets-Sheet 1

INVENTOR
W. H. T. HOLDEN
BY
P. C. Smith
ATTORNEY

Aug. 21, 1945. W. H. T. HOLDEN 2,382,994
ELECTRIC MANEUVERING BOARD
Filed Dec. 11, 1943 3 Sheets-Sheet 2

FIG. 3

INVENTOR
W.H.T. HOLDEN
BY P.C. Smith
ATTORNEY

Aug. 21, 1945.   W. H. T. HOLDEN   2,382,994
ELECTRIC MANEUVERING BOARD
Filed Dec. 11, 1943   3 Sheets-Sheet 3

INVENTOR
*W.H.T. HOLDEN*
BY *P. C. Smith*
ATTORNEY

Patented Aug. 21, 1945

2,382,994

UNITED STATES PATENT OFFICE 2,382,994

ELECTRIC MANEUVERING BOARD

William H. T. Holden, Woodside, N. Y., assignor to Bell Telephone Laboratories, Incorporated, New York, N. Y., a corporation of New York Application December 11, 1943, Serial No. 513,972

7 Claims. (Cl. 235—61)

This invention relates to a telemetric system and more particularly to a maneuvering board for enabling navigational problems to be solved electrically.

It is now the general practice for the navigator on board a ship to work out navigational problems on a maneuvering board which is located on his work table. To work out problems on the maneuvering board it is necessary for the navigator to place a sheet of paper on the board which paper is a compass rose with added lines for circular and in some times rectangular coordinates, to then plot on the paper the positions of his problem and to then construct the speed and direction triangle or triangles from which he may determine the solution to the problem in hand.

While the geometrical solution of the velocity triangle can be made satisfactorily by graphic methods, for airplane use some form of mechanical computer has been found desirable. The maneuvering board which has been developed for use on aircraft for the purpose of solving various problems of dead reckoning navigation comprises a transparent plotting surface having a compass rose and two concentric circles inscribed thereon. The two concentric circles enclose a space known as the compass course ring which when properly filled in by the navigator may be used in conjunction with the compass rose for correcting magnetic courses to compass courses and vice versa.

Beneath the plotting surface is a grid disc having its center pivoted to lie in alignment with the center of the compass rose and rotatable about such pivot. The grid disc has inscribed thereon a system of green concentric circles with a spacing such as may be used as a measure for speeds and distances, with a network of coordinately arranged red lines tangent to the circles and thus similarly spaced, and with variation scales which appear through the transparent plotting surface as lying just outside the compass rose. This disc bears at the end of the diametrical red line which extends through the centers of the variation scales, red markers which are called the true indexes.

By turning the grid disc with respect to the plotting surface the navigator is able to find lines thereon which may be positioned in the direction of the lines which he must plot on the plotting surface and which lines he may then trace freehand on the plotting surface with the required length determined from the spacing of the circles or lines on the grid disc. The navigator is thus enabled to plot the triangles necessary to the solution of any problem in navigation which may arise without the necessity of using drafting instruments.

In a single place plane in which the pilot must serve as his own navigator, it is necessary for the pilot to hold the maneuvering board on his knees and to do the necessary plotting thereon while he attends to the control of the plane. This procedure becomes very awkward to carry out in rough air when the plane requires nearly constant piloting. It is therefore the object of the present invention to provide a maneuvering board by which the pilot may solve any of the usual maneuvering problems which may arise by the simple turning of adjustable knobs to positions indicative of distances, speeds or bearing directions.

For the purpose of attaining this object, the maneuvering board in accordance with the present invention is provided with three pairs of setting knobs for electrically plotting a maximum of three known vectors, with a pair of setting knobs for securing the resultant vector and with indicating devices indicating when electrical balances have been attained. Each pair of vector plotting knobs comprises one knob for plotting the magnitude of a vector having an indicator movable over arbitrarily graduated scales and operable to adjust the brush of a potentiometer. The other vector knob for plotting the direction of the vector carries an indicator movable over a compass rose and is operable to orient the rotor winding of a synchro-transmitter with respect to the stator windings thereof which windings are disposed in quadrature with respect to each other.

For securing the $x$ and $y$ coordinates of a fourth or solution vector, two additional potentiometers are provided, the brushes of which are connected to two series circuits extending through the corresponding phase positioned stator windings of the synchro-transmitters and the windings of which are connected in series across the secondary winding of a transformer, the midpoint of which transformer winding is grounded and the primary winding of which is energized by the alternating current supply which supplies potential to the potentiometers associated with the synchro-transmitters. The setting knob of each potentiometer is provided with an indicator which cooperates with differently graduated scales.

As an alternative arrangement for securing the magnitude and direction of a fourth or solution vector, two adjustable knobs may be provided, one of which is operable to move the brush of a potentiometer and to move an indicator with respect to a plurality of differently graduated scales to indicate the measure of the magnitude of the resultant vector and the second of which is operable to move the rotor winding of a synchro-transmitter with respect to the stator windings of such transmitter which stator windings are connected in quadrature with respect to each other. This knob carries an indicator which is movable with respect to a compass rose to indicate the direction of the resultant vector.

The potentiometers associated with all of the synchro-transmitters are connected to be energized from the same source of alternating current potential and corresponding phase positioned stator windings of all of the transmitters are connected in series.

For indicating in either type of circuit when the summation of the potentials generated in the serially-connected stator winding circuits of the three synchro-transmitters have been balanced by the operation of the two knobs serving to secure the value of the fourth or solution vector, indicators of the so-called "magic eye" type, widely used in radio sets, are employed.

For a clearer understanding of the invention and the mode of its operation reference may be had to the following detailed description taken in connection with the accompanying drawings in which.

Figure 3:
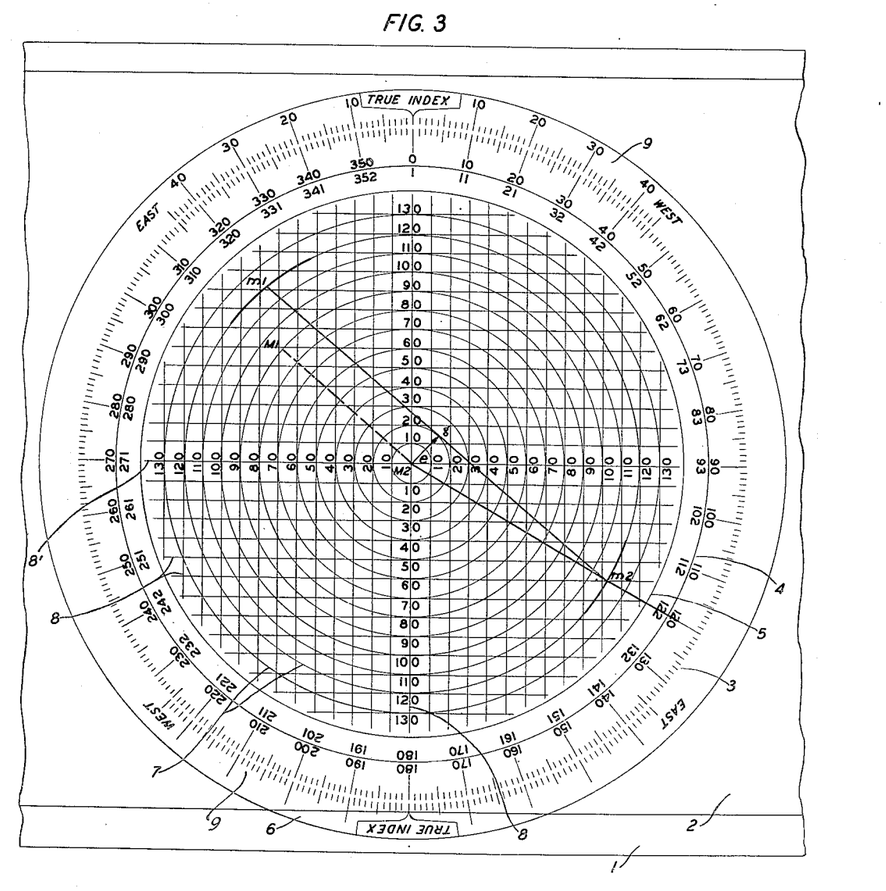
Fig. 3 is a view of a maneuvering board which is now commonly used in aircraft with a typical problem graphically plotted thereon.

Referring first to Fig. 3, which illustrates a type of graphical maneuvering board now commonly used on aircraft, the baseboard is indicated at 1 and has secured thereto a plotting surface 2 of suitable transparent material upon which the navigator may plot easily erasable lines for constructing maneuver triangles. The plotting surface 2 has a compass rose 3 inscribed thereon and two concentric circles 4 and 5 also inscribed thereon just inside the compass rose and between which circles the navigator may insert correction figures which he may use in conjunction with the compass rose for converting magnetic courses to compass courses and vice versa. Pivoted at its center to the board 1 with its pivot point beneath the center of the compass rose of the plotting surface 2 and beneath the plotting surface, is a a rotatable grid disc 6. This disc has inscribed thereon a system of evenly spaced concentric circles 7 which are colored green and with a spacing such as may be used as a measure of velocities or distances, a network of coordinately arranged red lines 8, tangent to the circles and thus similarly spaced, and with variation scales 9 which appear through the plotting surface as lying outside the compass rose 3. This disc also has inscribed thereon at the end of the grid line 8 which extends diametrically through the centers of the two variation scales 9, two red markers each one of which is labeled "True Index."

Figure 1:
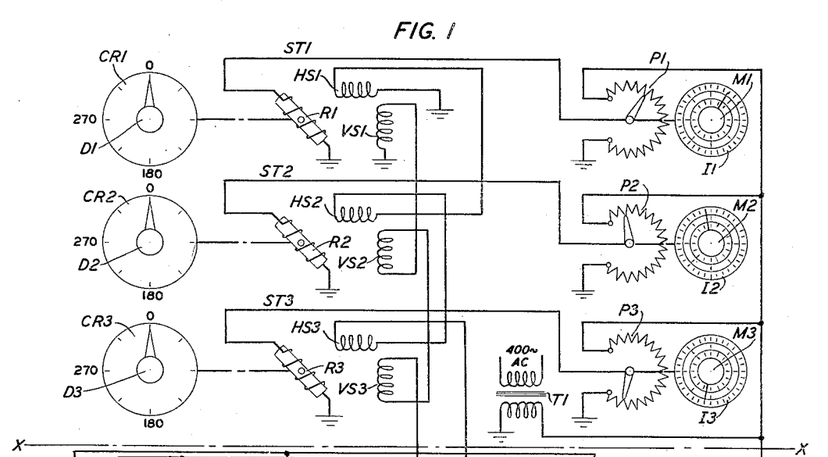
Fig. 1 taken with Fig. 2A shows a circuit illustrating schematically one embodiment of the invention, Fig. 1 showing apparatus for electrically plotting three known vectors of a problem and Fig. 2A showing apparatus for electrically plotting the $x$ and $y$ coordinates of the vector which is the solution of a problem.
Figure 2A:
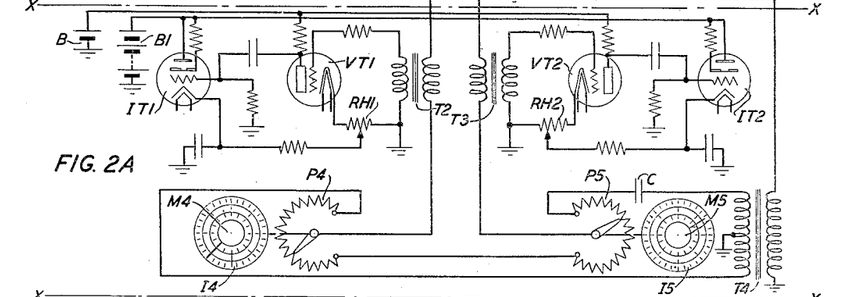

The electric maneuvering board disclosed in Figs. 1 and 2A is capable of solving problems involving four vectors. It comprises three synchro-transmitters ST1, ST2, and ST3, three associated adjustable potentiometers P1, P2 and P3, two solving potentiometers P4 and P5 of the adjustable type, and two detector circuits.

Each of the synchro-transmitters is provided with a single winding rotor rotatable by a setting knob connected to the shaft of the rotor and with a two-winding stator, the windings of which are positioned in quadrature with respect to each other. For example rotor R1 of the synchro-transmitter ST1 is rotatable by the knob D1 with respect to the horizontal and vertical stator windings HS1 and VS1, the position of rotation being indicated by a pointer attached to the knob D1 on the dial CR1 which may be calibrated as a compass rose.

Each of the potentiometers P1, P2 and P3 is provided with a brush movable by a setting knob which knob has a pointer secured thereto movable over a plurality of differently graduated scales. For example, the setting knob M1 of potentiometer P1 is operable to move the potentiometer brush and to move the pointer of the indicator I1. The brush of the potentiometer P1 is connected to one terminal of the winding of rotor R1 of the associated synchro-transmitter, the other terminal of the rotor winding being connected to the ground terminal of the secondary winding of the alternating current supply transformer T1. One winding terminal of the potentiometer P1 is also connected to the ground terminal of the primary winding of transformer T1, the other winding terminal being connected to the ungrounded terminal of the secondary winding of transformer T1. The other potentiometers P2 and P3 are similarly connected to the windings of the rotors R2 and R3 and to the secondary winding of the transformer T1. The primary winding of transformer T1 is connected to a suitable source A. C. of alternating current.

The knobs M1, M2 and M3 may be operated to adjust the potentiometers P1, P2 and P3 to apply potentials to the windings of rotors R1, R2 and R3, respectively, proportional to the magnitudes of three different vectors, such magnitudes being indicated by the positions of the pointers with respect to the scales of the associated indicators I1, I2 and I3. The knobs D1, D2 and D3 may be operated to rotate the rotors R1, R2 and R3, respectively, to angular positions corresponding to the angular directions of the three vectors, such angular directions being indicated in degrees by the positions of the three pointers carried by such knobs with respect to the compass roses CR1, CR2 and CR3.

The vertical stator windings VS1, VS2 and VS3 are connected in series through the primary winding of the transformer T2 to the brush of the solving potentiometer P4 and the horizontal stator windings HS1, HS2 and HS3 are likewise connected in series through the primary winding of transformer T3 to the brush of solving potentiometer P5. The brushes of these potentiometers are movable by the associated knobs M4 and M5 which knobs are also effective to move the pointers of indicators I4 and I5 over suitably graduated scales. Each of these indicators may be provided with a plurality of differently graduated scales corresponding to the scales of the indicators I1, I2 and I3. The upper terminal of the winding of potentiometer P4 is connected to the outside terminal of the lower secondary winding of transformer T4. The upper terminal of the winding of potentiometer P5 is connected through the condenser C to the outside terminal of the upper secondary winding of transformer P4 and the lower or zero potential terminals of the windings of both potentiometers are connected together. The inner terminals of the secondary windings of transformer T4 are connected together and to ground and the primary winding of this transformer is connected in series with the secondary winding of supply transformer T1 whereby a potential is applied to both potentiometers P4 and P5. The condenser C serves to balance out the phase shift resulting from the manner of connection of the secondary windings of transformer T4.

The secondary winding of each of the transformers T2 and T3 is connected to a detector circuit. Each of these detector circuits comprises an amplifier tube and an indicator tube. For example, the secondary winding of transformer T2 is connected to the input circuit of amplifier tube VT1, the output circuit of which is connected to the input circuit of the indicator tube IT1. The indicator tubes IT1 and IT2 may, for example, be of the type known as the "magic eye," such as is disclosed in Patent No. 2,051,189 granted August 18, 1936 to H. M. Wagner. For adjusting the "eyes" rheostats RH1 and RH2 are provided. Anode potential for the tubes VT1 and VT2 may be supplied from a 26 to 28 volt direct current source B and anode potential for the indicator tubes may be supplied by rectifying alternating current from the 400 cycle source alternating current, both of which sources are usually a part of the equipment of airplanes on which this invention would be used. The rectified anode potential source is illustrated by source B1.

In the operation of the electrical maneuvering board just described potentials proportional to the $x$ and $y$ coordinates of the three vectors, the directions and magnitudes of which are set up by the operation of the vector direction knobs D1, D2 and D3, and by the operation of the vector magnitude knobs M1, M2 and M3, are added and then balanced by the setting of the solving knobs M4 and M5 until, upon the condition of balance, the magic eye indicators IT1 and IT2 will show closed eye conditions. The indicators I4 and I5 will then indicate the values of the $x$ and $y$ coordinates of the fourth or solution vector.

Figure 2B:
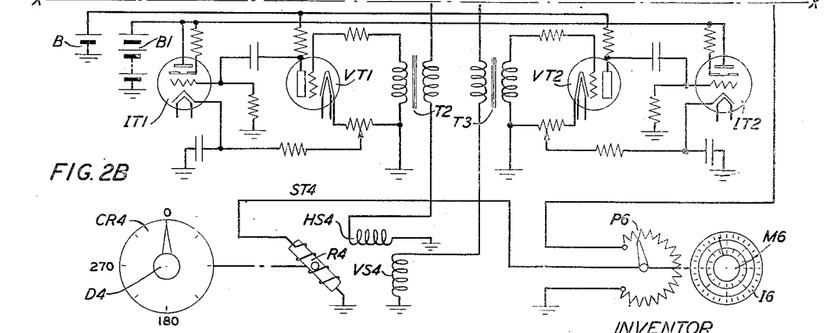
Fig. 2B shows a modified apparatus for use with the apparatus of Fig. 1 for electrically plotting the vector which is the solution of a problem in terms of its direction and magnitude.

As a modification, the apparatus of Fig. 2B may be substituted for the apparatus of Fig. 2A. This apparatus includes similar detector circuits, a synchro-transmitter ST4 and an associated potentiometer P6. The transmitter ST4 has a rotor R4 operable by the knob D4 and a two-winding stator, the horizontal winding HS4 of which is connected in series with the horizontal stator windings HS1, HS2 and HS3 of the synchro-transmitters ST1, ST2 and ST3, and the vertical stator winding VS4 of which is mounted in quadrature with respect to winding HS4 and connected in series with the vertical stator windings VS1, VS2 and VS3 of the synchro-transmitters ST1, ST2 and ST3. The knob D4 is provided with a pointer which cooperates with a dial CR4 calibrated as a compass rose. The winding of potentiometer P6 has one terminal connected to the ground terminal of the secondary winding of supply transformer T1 and has its other terminal connected to the ungrounded terminal of such secondary winding. The brush of the potentiometer is connected to one terminal of the winding of rotor R4, the other terminal of which rotor is connected to the grounded terminal of the secondary winding of transformer T1. This brush is movable by the knob M6 which knob also moves the pointer of indicator I6 with respect to the scales thereof. This indicator may have a plurality of differently graduated scales similar to the scales of indicators I1, I2 and I3.

In the operation of this modified form of the electrical maneuvering board, potentials proportional to the $x$ and $y$ coordinates of the three vectors, the directions and magnitudes of which are set up by the operation of the vector direction knobs D1, D2 and D3 and by the operation of the vector magnitude knobs M1, M2 and M3, are added and then balanced by the setting of the knobs D4 and M4 until upon the condition of balance the magic eye indicators IT1 and IT2 will show closed eye conditions. The pointer cooperating with dial CR4 will then indicate the compass direction of the fourth or solution vector and the indicator I6 will indicate the magnitude of such vector.

In order to bring out more clearly the use of the invention a typical navigation problem will be assumed and solved by the use of the maneuvering board method heretofore employed and the solution of the same problem on the electrical maneuvering board of the present invention will then be described. The assumed problem is as follows:

Situation

A scouting airplane is 90 miles from its carrier base on a true bearing of 310 degrees. The carrier is proceeding at a speed of 30 knots on a true course of 035 degrees. The carrier orders the airplane to rejoin it using a cruising speed of 180 knots.

Required

The course to be steered by the airplane pilot (a) with no wind (b) with a due west wind of 15 knots.

Maneuvering board solution

Referring to Fig. 3, which discloses a typical airplane maneuvering board, it will be assumed that each of the divisions represented between concentric circles 7 on the grid disc 6 represents a distance of 10 miles and that each of the divisions also represents a speed of 15 knots. With the grid disc true index set as indicated opposite the 000 degrees division of the compass rose 3 on the plotting surface 2 and the position of the carrier $e$ placed at the center of the grid disc, draw a line on the plotting surface from $e$ along the line through division 310 degrees of the compass rose and then lay off on the line a distance of 90 miles designating the position M1 of the airplane using the distance scale of one division for ten miles. M2, the final position of the airplane, will be coincident with $e$. M1—M2 is the relative movement line. Draw on the plotting surface the vector $e$—$g$ along the line extending through the division 035 degrees of the compass rose having a length of two divisions using the speed scale of one division for 15 knots. This vector will then represent the course and speed of the carrier.

Case (a).—With $e$ as a center draw a circle on the plotting surface whose radius, using the speed scale, corresponds to the speed of the airplane or 180 knots which, in the case assumed, will coincide with the grid disc circle labeled 120. The slope of line M1—M2 is now transferred to a line drawn through the point g. This may be most readily done by rotating the grid disc until one of its diameters, for example the diameter numbered 8', coincides with the line M1—M2 and then with a straight edge laid on the plotting surface with its edge adjacent the point g and parallel to the nearest line on the grid disc which is parallel to the diameter 8' a line is drawn through the point g until it intersects the speed circle, previously drawn, at points m1 and m2. A line now drawn from point e through point m2 gives the course of the airplane. To determine this course the grid disc is rotated back to its true index position and the course will be found to be 120 degrees, the required answer.

Figure 4:
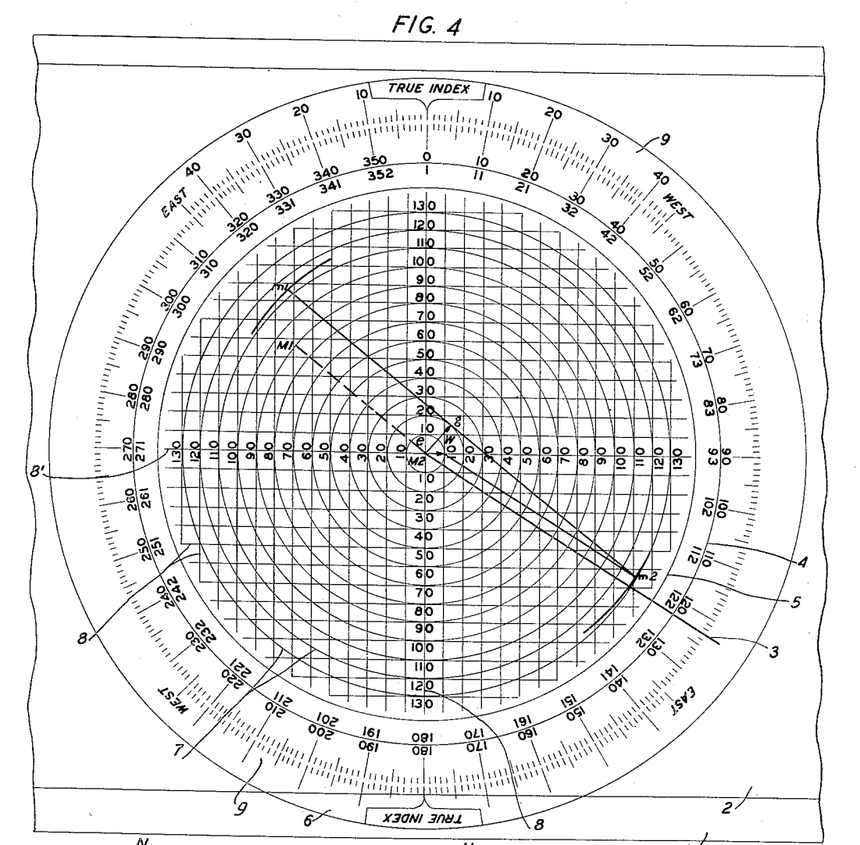
Fig. 4 is a view of the maneuvering board with a modified problem graphically plotted thereon.

*Case (b).*—Referring now to Fig. 4, with the grid disc true index set as indicated and the position of the carrier e placed at the center of the grid disc, draw the relative motion line M1—M2 and the vector e—g representing the course and speed of the carrier as before. Draw the wind vector e—w extending due east from e since the assumed wind is a due west wind having a length of one division using the speed scale of one division for 15 knots. This vector will then represent the direction and velocity of the wind. With the point w as a center instead of the point e draw a circle whose radius, using the speed scale, corresponds to the speed of the airplane or 180 knots. The slope of line M1—M2 is now transferred as before to a line drawn through the point g and intersecting the speed circle just drawn at point m2. A line now drawn from point w through point m2 gives the course of the airplane. To determine this course on the compass rose of the plotting surface draw a line through point e parallel to the line w—m2 intersecting the compass rose. This line will be found to intersect the compass rose at 123 degrees, the required answer.

In connection with the problems just described, reference may be made to H. O. 217, "Maneuvering Board Manual," page 6, case III.

Figure 5:
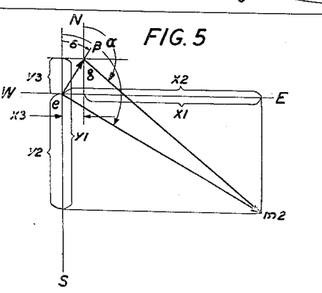
Fig. 5 is a vector diagram illustrative of the problem plotted in Fig. 3.

The (Case a) problem illustrated in Fig. 3 may be illustrated by the vector diagram shown in Fig. 5 in which the vector magnitudes are drawn with velocity values. In this figure $eg$ represents the carrier and has a magnitude equivalent to 30 knots and makes an angle with the NS line through the point e where the carrier starts of $\delta = 035$ degrees. Vector $gm2$ has an unknown magnitude and makes an angle with the NS line through the point g of $\alpha = 310$ degrees $-180$ degrees or 130 degrees or the direction of the relative movement line between the assumed position M1 of the airplane with respect to the position e of the carrier when the airplane starts on its flight to intercept the carrier. The vector $em2$ completes the velocity triangle and has a magnitude equivalent to 180 knots, or the speed of the airplane, and the angle $\beta$ which it makes with the NS line through the point e is the direction angle which the airplane must fly to intercept the carrier.

From this vector triangle the following equations may be formed:

$$\text{Vector } eg + \text{vector } gm2 = \text{vector } em2 \quad (1)$$
$$\text{Vector } eg + \text{vector } gm2 - \text{vector } em2 = 0 \quad (2)$$

or $$\text{Vector } eg + \text{vector } gm2 + \text{vector } m2e = 0 \quad (3)$$

The $x$ and $y$ coordinates of these vectors along the NS and WE reference lines drawn through the points e and g, giving the coordinates plus values when extending N to S or from W to E and negative values when extending from S to N or from E to W and the sines and cosines of the angles their proper positive and negative values, may be expressed as follows:

$$\text{Vector } eg + x3 = +eg \sin \delta + y3 = +eg \cos \delta \quad (4)$$
$$\text{Vector } gm2 + x1 = -gm2 \sin \alpha - y1 = +gm2 \cos \alpha \quad (5)$$
$$\text{Vector } em2 + x2 = -em2 \sin \beta - y2 = +em2 \cos \beta \quad (6)$$
$$\text{Vector } m2e - x2 = +m2e \sin \beta + y2 = -m2e \cos \beta \quad (7)$$

Now adding the coordinate equations 4, 5 and 7 of the vectors forming Equation 3 we have $$x3 + x1 - x2 = eg \sin \delta - gm2 \sin \alpha + m2e \sin \beta$$

also $$y3 - y1 + y2 = eg \cos \delta + gm2 \cos \alpha - m2e \cos \beta$$

Now referring to Fig. 5 it is seen that $$x3 + x1 - x2 = 0 \text{ and } y3 - y1 + y2 = 0$$

and therefore it follows that $$eg \sin \delta - gm2 \sin \alpha + m2e \sin \beta = 0 \text{ and} \quad (8)$$
$$eg \cos \delta + gm2 \cos \alpha - m2e \cos \beta = 0 \quad (9)$$

*Electrical maneuvering board solution case "a"*

Referring now to Figs. 1 and 2B, Equations 8 and 9 may be solved on the electrical maneuvering board shown therein in the manner now described. Assume a velocity scale for use on the indicators I1, I2, I3 and I6. The course and speed of the carrier represented by the vector $eg$ in Fig. 5 are known, the course angle $\delta$ being 035 degrees and the speed being 30 knots. This vector may therefore be expressed electrically on the maneuvering board by the setting of knobs M1 and D1. To this end the knob M1 is turned until the pointer associated with the indicator I1 is positioned on the scale division corresponding to the speed of the carrier or 30 knots, whereupon the brush of the associated potentiometer P1 is set with respect to such potentiometer winding to apply a potential derived from the potential impressed from the source A. C. through the windings of transformer T1 across the winding of rotor R1 of the synchro-transmitter ST1 commensurate with the magnitude of the vector $eg$. The knob D1 is then turned until the pointer associated with the compass rose CR1 is positioned on the 035 degree division thereof whereupon the winding of the rotor R1 of the synchro-transmitter ST1 is rotated through a corresponding angle or the angle $\delta$ of the direction of the vector $eg$. Potentials are now generated in the stator windings of the transmitter ST1, the potential generated in the horizontal stator winding HS1 having a value $+eg \sin \delta$ and the potential generated in the vertical stator winding VS1 having a value $+eg \cos \delta$ or the potential values of the first elements of the Equations 8 and 9.

The direction of the vector $gm2$, shown in Fig. 5, that is the angle $\alpha$ is known since this angle has a value of 310 degrees, the true bearing of the airplane with respect to the carrier at the time the airplane starts on its return flight to the carrier minus 180 degrees or 130 degrees. The knob D2 is now turned until the pointer associated with the compass rose CR2 is positioned on the 130 degree division thereof whereby the rotor winding of rotor R2 of the synchro-transmitter ST2 is similarly rotated with respect to its stator windings. The magnitude of the vector $gm2$ is not known but it is known to approximate the magnitude of the vector $m2e$ the magnitude of which is known to be 180 knots. The dial M2 is therefore temporarily turned until the pointer associated with the indicator I2 is positioned on the scale division corresponding to 180 knots whereupon the brush of the associated potentiometer P2 is set with respect to such potentiometer winding to apply a potential from the source A. C. across the winding of rotor R2 of synchro-transmitter ST2 commensurate with the approximated magnitude of the vector $gm2$. With the winding of rotor R2 set by the knob D2 as previously described commensurate with the angle $\alpha$ potentials are generated in the stator windings of the transmitter ST2, the potential generated in the horizontal stator winding HS2 being an approximation of the value $-gm2 \sin \alpha$ and the potential generated in the vertical stator winding VS2 being an approximation of the value $+gm2 \cos \alpha$ or the potential values of the second elements of the Equations 8 and 9.

Since only three vectors are involved in the problem under consideration it is not necessary to utilize the synchro-transmitter ST3 in its solution and therefore the knob M3 is turned until the pointer associated with the indicator I3 is positioned on the zero scale division at which time the brush of the associated potentiometer P3 will be out of engagement with such potentiometer winding and no potential from the source A. C. will be applied across the winding of rotor R3 of the transmitter ST3 and no potentials will therefore be generated in the horizontal and vertical stator windings HS3 and VS 3 thereof.

The magnitude of the third vector $m2e$ is known to be 180 knots but the direction angle $\beta$ of this sector, and which angle is the direction in which the airplane must be flown to intercept the carrier and the required solution of the problem, is not known. The knob M6 is now turned until the pointer associated with the indicator I6 is positioned on the scale division corresponding to the speed of the airplane or 180 knots whereupon the brush of potentiometer P6 is set with respect to such potentiometer winding to apply a potential from the source A. C. across the winding of rotor R4 of the synchro-transmitter ST4 commensurate with the magnitude of the vector $m2e$. The knob D4 is now turned in turn rotating the winding of rotor R4 of transmitter ST4 with respect to the stator windings of such transmitter until the magic eye tubes IT1 and IT2 indicate substantially closed eye conditions. With knob D4 thus roughly adjusted and a potential commensurate with the magnitude of vector $m2e$ impressed upon the winding of rotor R4 of transmitter ST4, potentials are generated in the stator windings of this transmitter, the potential generated in the horizontal stator winding HS4 having the approximate value $+m2e \sin \beta$ and the potential generated in the vertical stator winding VS4 having the approximate value $-m2e \cos \beta$ or the approximation of the potential values of the last elements of Equations 8 and 9.

The potentials generated in the horizontal stator windings HS1, HS2 and HS4 of transmitters ST1, ST2 and ST4 are added together since these stator windings are connected in series and are impressed as a single potential through the windings of transformer T2 upon the input circuit of amplifier tube VT1 having the approximate value $+eg \sin \delta -gm2 \sin \alpha +m2e \sin \beta$ and, until the knobs M2 and D4 have been so adjusted that this potential becomes zero, this potential is amplified by tube VT1 and impressed upon the indicator tube IT1. Similarly, the potentials generated in the vertical stator windings VS1, VS2 and VS4 of transmitters ST1, ST2 and ST4 are added together and impressed as a single potential through the windings of transformer T3 upon the input circuit of amplifier tube VT2 having the approximate value of $eg \cos \delta + gm2 \cos \alpha = m2e \cos \beta$ and, until knobs M2 and D4 have been so adjusted that this potential becomes zero this potential is amplified by the tube VT2 and impressed upon the indicator tube IT2.

To secure the correct solution of the problem the knobs D4 and M2 are now carefully turned until the indicator tubes both show closed eye conditions which will occur when no potentials are impressed through the transformers T2 and T3 at which time the Equations 8 and 9 will be satisfied. The pointer moved by knob D4 will now be positioned over a division of the compass rose CR4 indicating the solution angle of the problem or the compass heading on which the airplane must be flown at the assumed speed at 180 knots to intercept the carrier. This angle indication will be 120 degrees.

Figure 6:
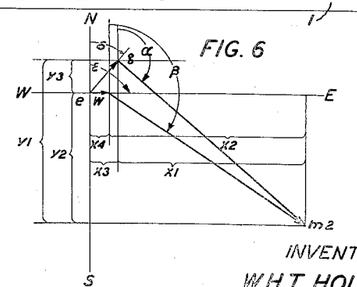
Fig. 6 is a vector diagram illustrative of the problem plotted in Fig. 4.

The (Case b) problem illustrated in Fig. 3 may be illustrated by the vector diagram shown in Fig. 6 in which the vector magnitudes are drawn as velocity values. In this figure vector $eg$ represents the carrier and has a magnitude equivalent to 30 knots and makes an angle with the NS line through the point $e$ where the carrier starts of $\delta=035$ degrees. Vector $gm2$ has an unknown magnitude and makes an angle with the NS line through the point $g$ of $\alpha=310$ degrees—180 degrees or 130 degrees or the direction of the relative movement line between the assumed position MI of the airplane with respect to the position $e$ of the carrier when the air plane starts on its flight to intercept the carrier. The vector $ew$ represents the wind and has a magnitude equivalent to the velocity of the wind or 15 knots and makes an angle with the NS line through the point of $e$ of $\epsilon=090$ degrees. The vector diagram is completed by the vector $wm2$ which has a magnitude equivalent to 180 knots or the speed of the airplane and a direction angle $\beta$ with respect to the NS line through the point $w$ or the compass bearing which the airplane must fly to intercept the carrier and which angle is required to be determined.

From the vector diagram the following equations may be formed:

$$\text{Vector } eg + \text{vector } gm2 = \text{vector } ew + \text{vector } wm2 \quad (10)$$
$$\text{Vector } eg + \text{vector } gm2 - \text{vector } ew - \text{vector } wm2 = 0 \quad (11)$$

or $$\text{Vector } eg + \text{vector } gm2 + \text{vector } we + \text{vector } m2w = 0 \quad (12)$$

The $x$ and $y$ coordinates of these vectors along the NS and WE reference lines drawn through the points $e$, $g$ and $w$, giving the coordinates plus values when extending from N to S or from W to E and negative values when extending from S to N and from E to W and the sines and cosines of the angles their proper positive and negative values, may be expressed as follows:

$$\text{Vector } eg + x3 = +eg \sin \delta + y3 = +eg \cos \delta \quad (13)$$
$$\text{Vector } gm2 + x1 = -gm2 \sin \alpha - y1 = +gm2 \cos \alpha \quad (14)$$
$$\text{Vector } ew + x4 = +ew \sin \epsilon + y4 = +ew \cos \epsilon \quad (15)$$
$$\text{Vector } wm2 + x2 = -wm2 \sin \beta - y2 = +wm2 \cos \beta \quad (16)$$
$$\text{Vector } we - x4 = -we \sin \epsilon - y4 = -we \cos \epsilon \quad (17)$$
$$\text{Vector } m2w - x2 = +m2w \sin \beta + y2 = -m2w \cos \beta \quad (18)$$

Now adding the coordinate Equations 13, 14, 17 and 18 of the vectors forming Equation 12 we have $x3+x1-x4-x2=eg \sin \delta - gm2 \sin \alpha - we \sin \epsilon + m2w \sin \beta$; also $y3-y1-y4+y2=eg \cos \delta + gm2 \cos \alpha - we \cos \epsilon - m2w \cos \beta$.

Now referring to Fig. 6 it is apparent that $x3+x1-x4-x2=0$ and $y3-y1-y4+y2=0$ and therefore it follows that $$eg \sin \delta - gm2 \sin \alpha - we \sin \epsilon + m2w \sin \beta = 0 \quad (19)$$
$$eg \cos \delta + gm2 \cos \alpha - we \cos \epsilon - m2w \cos \beta = 0 \quad (20)$$

Electrical maneuvering board solution of problem case "b"

Referring now to Figs. 1 and 2B, Equations 19 and 20 may be solved on the electrical maneuvering board in the manner now discussed. The course and speed of the carrier represented by the vector $eg$ in Fig. 6 are known, the course angle $\delta$ being 035 degrees and the speed 30 knots. This vector is therefore expressed electrically by turning the knob M1 until the associated pointer is positioned on the scale division of the indicator I2 corresponding to the speed 30 knots, and by turning the knob D1 until the associated pointer is positioned on a scale division of the compass rose CR1 indicating an angle of 035 degrees. As previously described a potential will be applied to the winding of rotor R1 of synchro-transmitter ST1 commensurate with the magnitude of the vector $eg$ and the rotor winding will be turned through the direction angle $\delta$ whereupon a potential $+eg \sin \delta$ is derived from the horizontal stator winding HS1 and a potential $+eg \cos \delta$ is derived from the vertical stator winding VS1 of the transmitter ST1 or the potential values of the first elements of Equations 19 and 20.

The direction of the vector $gm2$, that is, the angle $\alpha$ is known since this angle has a value of 310 degrees, the true bearing of the airplane with respect to the carrier at the time the airplane starts on its return flight to the carrier, minus 180 degrees or 130 degrees. The knob D2 is now turned until the pointer associated with the compass rose CR2 is positioned on the 130 degrees division thereof whereby the rotor winding of rotor R2 of synchro-transmitter ST2 is similarly rotated with respect to its stator windings. The magnitude of the vector $gm2$ is not known but it is known to approximate the magnitude of the vector $m2w$, the magnitude of which is known to be 180 knots. The dial M2 is therefore temporarily turned until the pointer associated with the indicator I2 is positioned on the scale division corresponding to 180 knots whereupon the brush of the associated potentiometer P2 is set with respect to such potentiometer winding to apply a potential from the source A. C. across the winding of the rotor R2 of synchro-transmitter ST2 commensurate with the approximated magnitude of the vector $gm2$. With the winding of rotor R2 set by the knob D2 as previously described commensurate with the angle $\alpha$, potentials are generated in the stator windings of the transmitter ST2, the potential generated in the horizontal stator winding HS2 being an approximation of the value $-gm2 \sin \alpha$ and the potential generated in the vertical stator winding VS2 being an approximation of the value $+gm2 \cos \alpha$ or the approximation of the potential values of the second elements of the Equations 19 and 20.

The direction and velocity of the wind represented by the vector $we$ are known, the direction angle $\epsilon$ being 180 degrees $-90$ degrees or 90 degrees and the velocity being 15 knots. This vector is therefore expressed electrically by the setting of knobs M3 and D3. To this end the knob M3 is turned until the pointer associated with the indicator I3 is positioned on the scale division corresponding to the velocity of 15 knots whereupon the brush of potentiometer P3 is set with respect to such potentiometer winding to apply a potential from the source A. C. across the winding of rotor R3 of the synchro-transmitter ST3 commensurate with the magnitude of the vector $we$. The knob D3 is then turned until the pointer associated with the compass rose CR3 is positioned on the 090 degree division thereof whereupon the winding of the rotor R3 of the transmitter ST3 is rotated through a corresponding angle or the angle $\epsilon$ of the direction of the vector $we$. Potentials are now generated in the stator windings of transmitter ST3, the potential generated in the horizontal stator winding HS3 having a value $-we \sin \epsilon$ and the potential generated in the vertical stator winding VS3 having a value $-we \cos \epsilon$ or the potential values of the third elements of the Equations 19 and 20.

The magnitude of the fourth vector $m2w$ is known to be 180 knots but the direction angle $\beta$ of this vector and which angle is the direction in which the airplane must be flown to intercept the carrier and the required solution of the problem, is not known. The knob M6 is now turned until the pointer associated with the indicator I6 is positioned on the scale division corresponding to the speed of the airplane or 180 knots whereupon the brush of potentiometer P6 is set with respect to such potentiometer winding to apply a potential from the source A. C. across the winding of rotor R4 of the synchro-transmitter ST4 commensurate with the magnitude of the vector $m2w$. The knob D4 is now turned in turn rotating the winding of rotor R4 of the transmitter ST4 with respect to its stator windings until the magic eye tubes IT1 and IT2 indicate substantially closed eye conditions. With knob D4 thus roughly adjusted and a potential commensurate with the magnitude of vector $m2w$ impressed upon the winding of rotor R4 of transmitter ST4 potentials are generated in the stator winding thereof, the potential generated in the horizontal stator winding HS4 having the approximate value $+m2w \sin \beta$ and the potential generated in the vertical stator winding VS4 having the approximate value $-m2w \cos \beta$ or the approximation of the potential values of the last element of Equations 19 and 20.

The potentials generated in the horizontal stator windings HS1, HS2, HS3 and HS4 of transmitters ST1, ST2, ST3 and ST4 are added together, since these windings are connected in series, and are impressed as a single potential through the windings of transformer T2 upon the input circuit of amplifier tube VT1 having the approximate value $eg \sin \delta - gm2 \sin \alpha - we \sin \epsilon + m2w \sin \beta$ and, until the knobs M2 and D4 have been so adjusted that this potential becomes zero, this potential is amplified by tube VT1 and impressed upon the indicator tube IT1. Similarly the potentials generated in the vertical stator windings VS1, VS2, VS3 and VS4 of transmitters ST1, ST2, ST3 and ST4 are added together and impressed as a single potential through the windings of transformer T3 upon the input circuit of the amplifier tube VT2 having the approximate value $eg \cos \delta + gm2 \cos \alpha - we \cos \epsilon - m2w \cos \beta$ and until knobs M2 and D4 have been so adjusted that this potential becomes zero, this potential is amplified by tube VT2 and impressed upon the indicator tube IT2.

To secure the correct solution of the problem the knobs D4 and M2 are now carefully turned until the indicator tubes both show closed eye conditions which will occur when no potentials are impressed through the transformers T2 and T3 at which time Equations 19 and 20 will become satisfied. The pointer moved by knob D4 will now be positioned over a division of the compass rose CR4 indicating the solution angle of the problem or the compass heading on which the airplane must be flown at the assumed speed of 180 knots to intercept the carrier. This angle indication will be 123 degrees.

These are only typical of problems which may be solved involving not more than four vectors. Other problems would be solved in a similar manner, the magnitudes of the vectors being established electrically by the setting of knobs M1, M2, M3 and M4 and the direction angles of the vectors being established by the setting of knobs D1, D2, D3 and D4.

What is claimed is:

1. In an electric maneuvering board, a plurality of synchro-transmitters, each having a single winding rotor and a stator with two windings positioned in quadrature, a source of alternating current, manually operable means for applying potential from said source to said rotor windings proportional to the magnitudes of vectors, manually operable means for rotatably displacing said rotor windings in accordance with the directions of said vectors, circuits for interconnecting the corresponding positioned windings of said transmitters whereby the potentials impressed thereupon from said transmitters are proportional to the sums of the x and y coordinates of said vectors, a responsive device associated with each of said circuits, and manually operable means for applying potentials from said source to said circuits until said responsive devices indicate conditions of minimum current flow in said circuits whereby the positions assumed by said latter manually operable means are indicative of the defining values of a resultant vector.

2. In an electric maneuvering board, a plurality of synchro-transmitters, each having a single winding rotor and a stator with two windings positioned in quadrature, a source of alternating current, manually operable means for applying potential from said source to said rotor windings proportional to the magnitudes of vectors, manually operable means for rotatably displacing said rotor windings in accordance with the directions of said vectors, circuits for interconnecting the corresponding positioned windings of said transmitters whereby the potentials impressed thereupon from said transmitters are proportional to the sums of the x and y coordinates of said vectors, a detector circuit inductively linked with each of said circuits, each of said detector circuits comprising an amplifier tube and an indicator tube, and manually operable means for applying potentials from said source to said interconnecting circuits until said indicator tubes indicate conditions of minimum current flow in said interconnecting circuits whereby the positions assumed by said latter manually operable means are indicative of the defining values of a resultant vector.

3. In an electric maneuvering board, a plurality of synchro-transmitters, each having a single winding rotor and a stator with two windings positioned in quadrature, a source of alternating current, potentiometers for applying potentials from said source to said rotor windings proportional to the magnitudes of vectors, setting knobs for operating said potentiometers, an indicator dial associated with each of said knobs having one or more scales arbitrarily graduated in terms of vector magnitudes, setting knobs for rotatably displacing said rotor windings in accordance with the directions of said vectors, an indicator dial associated with each of said latter knobs having its scale graduated as a compass rose for indicating the compass bearing of a vector, circuits for interconnecting the corresponding positioned windings of said transmitters whereby the potentials impressed thereupon from said transmitters are proportional to the sums of the x and y coordinates of said vectors, a responsive device associated with each of said circuits, means for applying potentials from said source to said circuits until said responsive devices indicate conditions of minimum current flow in said circuits, setting knobs for operating said latter means, and indicator dials associated with said latter knobs for indicating the defining values of a resultant vector.

4. In an electric maneuvering board, a plurality of synchro-transmitters, each having a single winding rotor and a stator with two windings positioned in quadrature, a source of alternating current, potentiometers for applying potentials from said source to said rotor windings proportional to the magnitudes of vectors, setting knobs for operating said potentiometers, an indicator dial associated with each of said knobs having one or more scales arbitrarily graduated in terms of vector magnitudes, setting knobs for rotatably displacing said rotor windings in accordance with the directions of said vectors, an indicator dial associated with each of said latter knobs having its scale graduated as a compass rose for indicating the compass bearing of a vector, circuits for interconnecting the corresponding positioned windings of said transmitters whereby the potentials impressed thereupon from said transmitters are proportional to the sums of the x and y coordinates of said vectors, a detector circuit inductively linked with each of said circuits, each of said detector circuits comprising an amplifier tube and an indicator tube, means for applying potentials from said source to said interconnecting circuits until said indicator tubes indicate conditions of minimum current flow in said interconnecting circuits, setting knobs for operating said latter means, and indicator dials associated with said latter knobs for indicating the defining values of a resultant vector.

5. In an electric maneuvering board, a plurality of synchro-transmitters, each having a single winding rotor and a stator with two windings positioned in quadrature, a source of alternating current, potentiometers for applying potentials from said source to said rotor windings proportional to the magnitudes of vectors, setting knobs for operating said potentiometers, an indicator dial associated with each of said knobs having one or more scales arbitrarily graduated in terms of vector magnitudes, setting knobs for rotatably displacing said rotor windings in accordance with the directions of said vectors, an indicator dial associated with each of said latter knobs having its scale graduated as a compass rose for indicating the compass bearing of a vector, circuits for interconnecting the corresponding positioned windings of said transmitters whereby the potentials impressed thereupon from said transmitters are proportional to the sums of the x and y coordinates of said vectors, a responsive device associated with each of said circuits, potentiometers for applying potentials from said source to said circuits until said responsive devices indicate conditions of minimum current flow in said circuits, setting knobs for operating said potentiometers, and indicator dials associated with said knobs having one or more scales arbitrarily graduated for indicating the magnitudes of the x and y coordinates of a resulting vector.

6. In an electric maneuvering board, a plurality of synchro-transmitters, each having a single winding rotor and a multiwinding stator, a source of alternating current, manually operable means for applying potentials from said source to said rotor windings proportional to the magnitudes of vectors, manually operable means for rotatably displacing said rotor windings in accordance with the directions of said vectors, an additional synchro-transmitter having a single winding rotor and a multiwinding stator, circuits for connecting the corresponding positioned stator windings of all of said transmitters in series, a responsive device associated with each of said circuits, and manually operable means for applying potential from said source to the rotor winding of said latter transmitter and for rotatably displacing said rotor winding until said responsive devices indicate conditions of minimum current flow in said circuits, whereby the positions assumed by said latter manually operable means are indicative of the magnitude and direction of a resultant vector.

7. In an electric maneuvering board, a plurality of synchro-transmitters, each having a single winding rotor and a stator with two windings positioned in quadrature, a source of alternating current, potentiometers for applying potentials from said source to said rotor windings proportional to the magnitudes of vectors, setting knobs for operating said potentiometers, an indicator dial associated with each of said knobs having one or more scales arbitrarily graduated in terms of vector magnitudes, setting knobs for rotatably displacing said rotor windings in accordance with the directions of said vectors, an indicator dial associated with each of said latter knobs having its scale graduated as a compass rose for indicating the compass bearing of a vector, an additional synchro-transmitter having a single winding rotor and a stator with two windings positioned in quadrature, circuits for interconnecting the corresponding phase-positioned windings of all of said transmitters in series, a responsive device associated with each of said circuits, a potentiometer for applying potential from said source to the rotor winding of said latter transmitter, a knob for operating said potentiometer, an indicator dial associated with said latter knob having one or more scales arbitrarily graduated in terms of a vector magnitude, a knob for rotatably displacing the rotor of said latter transmitter in accordance with the direction of the vector, and an indicator dial associated with said latter knob having its scale graduated as a compass rose, said latter two knobs being operable until said responsive devices indicate conditions of minimum current flow in said circuits, whereby the dials associated with said latter knobs indicate the magnitude and compass bearing of a resultant vector.

WILLIAM H. T. HOLDEN.